United States Patent Office 3,091,291
Patented May 28, 1963

3,091,291
PREVENTION OF GYPSUM SCALE FORMATION IN WATER FLOOD METHOD OF OIL PRODUCTION
Paul A. Little and Marvin Gambill, Hobbs, N. Mex., assignors to United Chemical Corporation of New Mexico, Hobbs, N. Mex., a corporation of New Mexico
No Drawing. Filed Jan. 6, 1960, Ser. No. 687
5 Claims. (Cl. 166—9)

This invention relates to a method of avoiding scale formation in oil well tubes, especially gypsum type scales, in wells where underground water flood methods of secondary recovery are being employed.

Deposits of calcium sulphate (gypsum) are a major cause of failure of oil-producing wells which depend on water pressure to bring the oil to the well. These deposits are brought about by saturation of the water with dissolved $CaSO_4$ as it passes, under pressure, through the underground formation, and a lowering of the $CaSO_4$-carrying capacity of the water brought about by the drop in pressure which occurs near the well bore. A lowering in temperature is also capable of decreasing the $CaSO_4$-carrying capacity of the water.

The conditions under which $CaSO_4$ deposits are produced are, essentially: the presence in the water of an amount of dissolved $CaSO_4$ equal to the maximum amount which the water is able to carry under the conditions of temperature and pressure prevailing prior to the formation of the deposit; and a lowering of the $CaSO_4$-carrying capacity of the water, brought about by a lowering of either pressure or temperature or both as the water enters the production well.

Calcium sulphate deposits may occur on the surface of the formation and on everything metallic with which $CaSO_4$-saturated water comes in contact while undergoing a lowering of its $CaSO_4$-carrying capacity following a drop in pressure or temperature. The deposits may cause blockage of the oil-bearing pores in the formation, closure of the annulus, heavy scaling of rods, tubing, pump, flow lines, heater treater, stock tanks, etc. The accumulating deposits bring about a decrease in the oil-producing capacity of these wells and necessitate the expenditure of much labor and money at the well site for remedial work.

It has been observed that calcium sulphate deposits are a greater problem in oil fields which have been newly placed on water flood than in fields which have been treated with water for a number of years. We have ascertained that certain newly opened production wells may have a major calcium sulphate problem, whereas neighboring wells which have been producing oil under water pressure for several years, may not.

It is, accordingly, a fundamental object of this invention to provide a method of producing wells and operating equipment in water flood areas by which calcium sulfate scale problems are avoided through artificially inducing the formation of carbonate in fissures in such formations to seal such fissures from contact with flood water. By so inducing the formation of a carbonate seal, the considerably lower solubility of the carbonate in flood water reduces, and to a great extent eliminates, calcium sulfate scale deposition in associated well equipment.

Other objects and advantages of the invention will in part be obvious and in part appear hereinafter.

Our process consists of treating oil formations with a solution of ammonium carbonate, or ammonium bicarbonate, or ammonium carbonate, or mixtures of such water soluble ammonium carbonate salts, in concentrations up to as high as saturation, but generally in a range of 5–10 percent by weight.

Since ammonium carbonate is not a very stable compound but an equilibrium reaction product mixture of $NH_3$, $CO_2$ and $H_2O$, it may, for purposes of this invention be looked upon as ammonium bicarbonate, that is, in theoretical calculations of need, etc., we compute the amount of material needed in terms of ammonium bicarbonate.

The solution is circulated into the oil formation with or as flood water, the actual volume being based on observations of the formation and its size, so that the amount of ammonium bicarbonate theoretically needed to seal off a formation is based essentially upon the following variables:

(1) P.p.m. $SO_4$ in input water
(2) P.p.m. $SO_4$ in produced water
(3) Barrels of water injected per day
(4) Barrels of water produced per day
(5) Time required for input water to reach the production wells Our method of treating the underground formation with ammonium bicarbonate for the purpose of establishing calcium carbonate barriers against contamination of formation water with $CaSO_4$ involves the principles of first, obtaining a minimum penetration of the surface of calcium sulfate deposits by employing effective concentrations of around 100 p.p.m. ammonium bicarbonate in the injected water; second, obtaining a maximum penetration of the channels and passageways through which the water moves in the formation, by maintaining a continuous supply of around 100 p.p.m. ammonium bicarbonate in the injection water over the period of time required for the appearance of $NH_4$ ion in the produced water and subsequent evidence of a reduction in calcium content due to effective treatment; third, maintaining the natural porosity and water-and-oil penetrability of the formation through the use of ammonium bicarbonate at such low concentrations (around 100 p.p.m.) that the replacement reaction will establish the desired calcium carbonate barriers with a minimum of penetration of the surface of the naturally occurring calcium sulphate deposits.

In carrying out our method we determine the exact level of ammonium bicarbonate to be maintained in the injection water for the purpose of obtaining these desired effects by adding 100 p.p.m. to the amount of ammonium bicarbonate needed to convert all of the $CaSO_4$ found dissolved in the injection water into $(NH_4)_2SO_4$. Therefore, we prefer to use water which is initially low in $CaSO_4$ content for purposes of injection.

On the basis of the observations of the behavior of $CaSO_4$ in solution and in oil well equipment, we have arrived at the following theory of the mechanism of our method:

(1) The factor determining whether or not a producing well has a calcium sulphate deposit problem is the ability of the water to extract calcium sulphate from the calcium sulphate deposits naturally present in the underground rock formation.

(2) A decrease in the ability of water to extract calcium sulphate from the formation cannot be attributed to an actual depletion of water-extractable $CaSO_4$ in the area through which the water passes en route from input well to production well since this would entail increases in the permeability of the structure much greater than those ever observed.

(3) A decrease in the ability of water to extract calcium sulphate may be expected to occur whenever water seals itself off from intimate contact with calcium sulphate deposits.

(4) Water containing a soluble carbonate will tend to seal itself off from intimate contact with calcium sulphate deposits by lining its channels with the less soluble calcium carbonate.

(5) The calcium carbonate seal may be formed as a double displacement reaction in which carbonate ions replace sulphate radicals without materially altering the physical structure (i.e., porosity) of the formation.
(6) Once sealed off from intimate contact with calcium sulphate by the development of calcium carbonate barriers, the water will tend to pass through the underground formation and arrive at the production well without having extracted from the formation the amounts of $CaSO_4$ required to produce saturation either at the temperatures and pressures prevailing within the formation or at the temperatures and pressures prevailing at the production well.
(7) Carrying less than the critical amount of dissolved calcium sulphate required for saturation at the various temperatures and pressures encountered, the water will be deprived of calcium sulphate-depositing ability under any of the conditions ordinarily prevailing in the system.

Since the solubility of calcium carbonate in water is extremely low (to the order of only 50–58 p.p.m. at atmospheric pressure and 68–83° F.) the ammonium bicarbonate represents a source of a more soluble from of carbonate which can be introduced into the input water to hasten the sealing off of calcium sulphate in the formation in the manner described.

By circulating ammonium bicarbonate solutions of from 10 to 15% concentration through equipment carrying thin deposits of calcium sulphate, the scale can be completely removed. In the case of heavy deposits, the ammonium carbonate solution does not remove the entire coating but honeycombs it with calcium carbonate formed in the reaction detailed below.

$$CaSO_4 + 2NH_4HCO_3 \rightarrow CaCO_3 + (NH_4)_2SO_4 + CO_2 + H_2O$$

The $CaSO_4$ (hydrated or anhydrous) is converted to $CaCO_3$, which precipitates out, and to soluble $(NH_4)_2SO_4$. Whatever the form of the calcium sulfate deposit—$CaSO_4 \cdot 2H_2O$; $CaSO_4 \cdot \frac{1}{2}H_2O$; or $CaSO_4$—ammonium bicarbonate in relation can be used to react with the calcium sulfate. For most efficient reaction, all of the $NH_4$ ion should appear in solution associated with $SO_4$ ion as $(NH_4)_2SO_4$ product of reaction.

Since the reaction proceeds with either gypsum or anhydrite and the sulphate ion goes into solution, the calcium ion forms the very insoluble calcium carbonate. However, though the initial reaction rate is fast, it slows down rapidly when any solid surface treated becomes coated with $CaCO_3$, which precipitates on the scale and retards further action of the ammonium carbonate on the calcium sulphate.

With increased concentration of the ammonium bicarbonate solution increased rate of attack on the scale is achieved, and the $CaCO_3$ deposits at a correspondingly increased rate. Increased temperature speeds up the rate of reaction somewhat, but it also brings about thermal decomposition of ammonium bicarbonate.

Pressure keeps the $CO_2$ produced by the reaction or that from the thermal decomposition of ammonium bicarbonate in solution.

Thus ammonium bicarbonate and related sources of carbonate ion in solution are eminently suitable for the carbonate seal of gypsum formations in accordance with this invention. This technique of developing barriers of calcium carbonate in underground formations to prevent saturation of water by dissolved $CaSO_4$ in its passage from input well to production well constitutes a useful tool in water flood operations. Accordingly, we define it as a "formation treatment." In the practice of the method, it is not our main objective either to remove anything from or to add anything to the water, per se; but, rather, it is our objective to employ the water as a convenient vehicle, to lay down a wall or skin of $CaCO_3$ as a protective barrier against continued contamination of the water by intimate contact with naturally occurring calcium sulfate deposits.

In the process of laying down the calcium carbonate barriers which represent the immediate objective and modus operandi by which we act to control the gypsum-forming tendency of formation water, an amount of $(NH_4)_2SO_4$ equivalent to the amount of $NH_4CO_3$ introduced may be expected to appear in the water arriving at the production wells. Since ammonium sulphate is a plant fertilizer, it is obviously a nonobjectional by-product which presents no disposal problem. Since ammonium sulphate does not occur normally in formation water, quantitative determinations of its presence at the production wells may be used as criteria for determining progress in treating a water-flood area with ammonium bicarbonate. The appearance of ammonium sulphate at the producing well is evidence for determining the time of passage of the first water treated with ammonium bicarbonate from the injection point through the intervening formation. Evidence of the successful accomplishment of the objective of sealing off calcium sulphate deposits from intimate contact with water can be had by quantitative determinations of the amount of calcium present in the water. As in our reports of field trials, the ratio of calcium to $NH_4$ should decrease as the amount of calcium sulphate in the water decreases and is replaced by the highly soluble ammonium sulphate resulting from the mutual displacement reaction between $NH_4HCO_3$ and $CaSO_4$. Experiments with ammonium bicarbonate as an agent for producing water-impenetrable films of calcium carbonate around pieces of gypsum may be summarized as follows:

*Example—Producing Wells*

Ammonium bicarbonate, preferably at 15 percent concentration by weight in water (initial concentration should be high) is placed in the well bore and moved under pressure into the surrounding formation. Depending on the formation, its porosity, pressures etc., the volume of solution used will be 20–200 barrels. Oil is a suitable medium for use in applying pressure to the solution after adding it to the bore.

At the temperature and pressure existing in water flood systems, the solution is stable and, given time, the ammonium bicarbonate will be converted fully to the calcium carbonate seal desired. Any $CaSO_4$ in the water, will of course be precipitated as $CaCO_3$ and will not appear as part of the seal. The ammonium bicarbonate added in the solution will not cause blockage of natural pores against oil and water flow when used as outlined, because it reacts only with pre-existing calcium sulfate and forms the calcium carbonate only in situ.

In such operations an effective concentration of 100 parts per million, and up to 1000 parts per million may be maintained in the flood water. Effective concentration refers to the ammonium bicarbonate in solution which reaches the formation, i.e., that which is over and above the amount of $CaSO_4$ which may have been dissolved in the formation water and precipitated as $CaCO_3$. An effective range of concentration within which useful results are obtained is in the order from 100 parts per million to 1000 parts per million and as a conservative statement of this effective range 10 to 10,000 parts per million is appropriate for purposes of definition.

The treatment is continuous—i.e., the level of ammonium bicarbonate is maintained in the flood water until the level of $NH_4SO_4$ in the water recovered indicates substantial conversion and deposition of the carbonate seal. The seal may be maintained thereafter by batch treatments.

What is claimed is:
1. The method of altering the surface of an oil formation underground in oil well flooding operations, which comprises, incorporating in flood water about 10–10,000 parts per million of a compound selected from the group consisting of ammonium carbonate, ammonium carbam- ate and mixtures thereof, the said amount being in excess over that necessary to precipitate as carbonate any calcium present in solution in the flood water, passing such solution into an oil well, forcing it into and through the earth formation penetrated by said oil well, thereby to react with gypsum in said formation and to deposit thereon a surface layer of calcium carbonate, and returning such solution to the surface.

2. The method of treating a calcium sulphate earth formation against contamination of flood water circulating in said calcium sulphate formation in oil well flooding operations, whereby the amount of calcium sulphate brought to the surface in flood water is reduced to a minimum, which comprises dissolving an ammonium carbonate compound in water to concentration approaching saturation, adding said ammonium carbonate compound solution to flood water being circulated in said flooding operation to bring the concentration of said carbonate compound to a level of about 10–10,000 parts per million in said flood water, injecting such flood water into the oil well earth formation under pressure, moving said water containing said carbonate compound into said earth formation under pressure to circulate in said oil producing formation, returning said flood water to the surface, testing said flood water for the presence of ammonium sulphate, and maintaining said circulation of said carbonate containing flood water to said earth formation until the ammonium sulphate content thereof shows a significant increase in concentration, said increase in concentration of ammonium sulphate being assumed to be directly proportional to the amount of calcium carbonate formed in the formation.

3. The method of producing an oil well in calcium sulphate containing earth formations which comprises introducing an ammonium carbonate compound into well water directly at the site of the producing well as a constituent of such aqueous treating agents as are used in the well for treatment of the earth formation, which comprises adding to the well water an amount of an ammonium carbonate compound sufficient to place in said well water 10–10,000 parts per million of ammonium carbonate as said water enters the well, causing said water to enter the earth formation, producing the oil and returning said water to the surface.

4. The method in accordance with claim 3 wherein said water is again caused to enter said earth formation, again producing the oil and returning said water to the surface the concentration of ammonium carbonate compound being maintained at said level by relating ammonium sulphate content of said solution at the surface to the amount of calcium carbonate precipitated superficially on the fissure surface by reaction of said calcium sulphate with the ammonium bicarbonate.

5. The method of producing an oil well wherein the well drains a calcium sulphate earth formation, which comprises, injecting water into said formation, maintaining in said water a concentration of an ammonium carbonate compound in a range from 10–10,000 parts per million over the amount needed to precipitate dissolved calcium sulphate in said water as carbonate, maintaining said solution in said formation under pressure for a period of time sufficient to induce reaction between said ammonium carbonate compound and said calcium sulphate formation, and thereafter returning said solution to the surface and determining the degree of reaction with calcium sulphate in said formation by determining the concentration of ammonium sulphate in said solution.

References Cited in the file of this patent
UNITED STATES PATENTS

| | | |
|---|---|---|
| 2,230,001 | McConnell et al. | Jan. 28, 1941 |
| 2,398,123 | Sowers | Apr. 9, 1946 |
| 2,787,326 | Hughes | Apr. 2, 1957 |
| 2,912,378 | Bernard | Nov. 10, 1959 |
| 2,954,825 | Bernard et al. | Oct. 4, 1960 |